United States Patent Office 3,117,852
Patented Jan. 14, 1964

3,117,852
METHOD OF CONTROLLING UNDESIRABLE
PLANT GROWTH
Israel J. Dissen, Chicago, Ill., assignor to Velsicol Chemical Corporation, Chicago, Ill., a corporation of Illinois
No Drawing. Filed Dec. 20, 1961, Ser. No. 160,930
5 Claims. (Cl. 71—2.5)

This invention relates to a method of controlling undesirable plant growth. More specifically, this invention relates to the method of controlling undesirable plant growth by applying thereto a compound of the formula

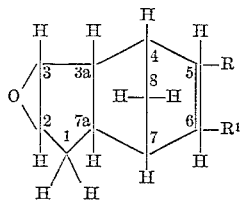

wherein R and R¹ are non-identical substituents selected from the group consisting of hydrogen, and 2,3-epoxypropoxy, provided that one of said substituents is hydrogen; its monomethyl homologs, wherein the methyl radical is on a 5-membered ring; its dimethyl homologs, wherein the methyl radicals are on non-adjacent 5-membered rings; and mixtures thereof.

In the compounds represented by the above structural formula, which are utilized in the method of the present invention, one of the substituents R and R¹ is hydrogen and the other is 2,3-epoxypropoxy. The compounds described above can have either of two isomeric structural formulae, that is with the hydrogen in the 5- or 6-position. Thus, the two isomeric compounds represented by the above structural formula are 2,3-epoxy-4,7-methano-3a,4,5,6,7,7a-hexahydro-5-indenyl glycidyl ether and 2,3-epoxy-4,7-methano-3a,4,5,6,7,7a - hexahydro - 6 - indenyl glycidyl ether.

Prior to the present invention many organic and inorganic substances have been proposed and used in attempts to control undesirable plants. While several of these substances were partially successful, the problem of controlling the vast number of species of undesirable plant life still exists. Some of the previously proposed substances are toxic to only a few species of plant life, while others are excessively toxic and indiscriminantly destroy both desirable and undesirable plant life. Moreover, a great number of the prior substances are ineffective as herbicides, while a number are toxic to animal life. Thus, although many substances have heretofore been proposed as herbicides the problem of the effective and selective control of undesirable plant life still exists.

Therefore, one object of the present invention is the destruction of undesirable plant life.

Another object of the present invention is to provide a method for the control of undesirable plant life.

Still another object, is to provide a method for the destruction of growing weeds.

These and other objects of the present invention will be readily apparent from the ensuing description.

The essential active ingredients of the herbicidal compositions used in the method of the present invention, described herein, can be readily prepared, for example, in a three step synthesis from a suitable unsubstituted or alkyl substituted dicyclopentadiene, or mixture thereof, and epichlorohydrin. In the first step, the suitable dicyclopentadiene is treated, for example, as described in Bruson and Reiner, J.A.C.S. 67, p. 723 (1945), to produce the corresponding alcohol.

In the second step, the alcohol intermediate is reacted with epichlorohydrin in the presence of an acid catalyst, such as aluminum trichloride, sulfuric acid, boron trifluoride, boron trifluoride-etherate complex and the like to form the propylene chlorohydrin ether intermediate, which is treated with an alkali metal hydroxide such as sodium hydroxide to yield the glycidyl ether product. The last step comprises epoxidizing the glycidyl ether product with an epoxidizing agent, such as a peracid, or hypochlorous acid.

Suitable dicyclopentadiene reactants for the first step are dicyclopentadiene, its monomethyl homologs, its dimethyl homologs wherein the methyl radicals are on non-adjacent 5-membered rings, and mixtures thereof. Dicyclopentadiene is readily formed by the dimerization of cyclopentadiene. The monomethyl homologs of dicyclopentadiene are formed by the adduction of one molecule of cyclopentadiene and one molecule of methylcyclopentadiene, while the dimethyl homologs are formed by the adduction of two molecules of methylcyclopentadiene.

Commercial methylcyclopentadiene is a mixture of position isomers, predominantly 1-methylcyclopentadiene and 2-methylcyclopentadiene, which are not economically separable. For the purposes of this invention, it is sufficient to use commercial methylcyclopentadiene.

Upon dimerization of cyclopentadiene and methylcyclopentadiene a mixture of the suitable reactants specified above are formed, which can be used without separation or can be separated into individual reactants or combinations of reactants. The monomethyl and dimethyl dicyclopentadiene reactants thus formed are isomeric mixtures, which are not economically separable from their isomers. It should be noted that for the purposes of this invention the mixture of isomeric compounds thus obtained is suitable as the dicyclopentadiene reactant, although individual isomers or combinations thereof can be used with equal success. It should also be noted that methyl radicals, if present, remain in the same position throughout the procedures described herein and in the diepoxide product. Thus, the dicyclopentadiene reactant 1-methyl-4,7-methano-3a,4,7,7a-tetrahydroindene will form 1-methyl-2,3-epoxy-4,7-methano-hexahydroindanyl glycidyl ether; the dicyclopentadiene reactant 4-methyl-4,7-methano-3a,4,7,7a-tetrahydroindene will form 4-methyl-2,3-epoxy-4,7-methanohexahydroindanyl glycidyl ether; and the dicyclopentadiene reactant 1,5-dimethyl-4,7-methano-3a,4,7,7a-tetrahydroindene will form 1,5-dimethyl-2,3-epoxy-4,7-methanohexahydroindanyl glycidyl ether.

The first step forms the corresponding alcohol of the dicyclopentadiene reactant by hydration of the latter with a suitable hydrating agent according to the procedure described in United States Patent No. 2,385,788 to Bruson.

Although it has not been shown whether the hydroxy radical appears in the 5- or 6-position of the hydrated dicyclopentadiene reactant it is believed that both position isomers are formed. Therefore, the hydroxy derivative of the starting material will be named herein without specifying the position of the hydroxy radical, since it is understood that a mixture of the two position-isomers is intended. Similarly, the derivatives of the hydroxy derivatives will be named without specifying the position of the radical replacing the hydroxy radical. For example, the hydroxy derivative formed from dicyclopentadiene, and designated hydroxy-4,7-methano-3a,4,5,6,7,7a-hexahydroindene, is understood to be a mixture of 5-hydroxy-4,7 - methano - 3a,4,5,6,7,7a - hexahydroindene and 6-hydroxy - 4,7 - methano - 3a,4,5,6,7,7a - hexahydroindene; while the diepoxide produced therefrom, designated as 2,3-epoxy-4,7-methanohexahydroindanyl glycidyl ether is understood to be a mixture of 2,3-epoxy-4,7-methanohexahydro-5-indanyl glycidyl ether and 2,3-epoxy-4,7-methanohexahydro-6-indanyl glycidyl ether.

In the second step the hydration product of the first step is reacted with preferably about one-half its molecular equivalent weight of epichlorohydrin, although other proportions can be successfully utilized, either with or without an inert solvent. The reaction is accomplished in the presence of a catalytic amount of an acidic catalyst such as those previously named. Upon mixing the reactants and catalyst, with warming if necessary, an exothermic reaction occurs. When the exothermic reaction subsides, the reactants are heated up to about 100° C. to insure maximum conversion. The catalyst is removed, for example, by neutralizing with a basic material, such as a salt of a weak acid and a strong base, a base, or a basic clay, followed by filtration of the reaction mixture. Unreacted epichlorohydrin, unreacted hydration product, and solvent, if present, are removed in vacuo, and the colorless liquid epichlorohydrin reaction product is recovered by distillation in vacuo. The propylene chlorohydrin radical is next converted to the glycidyl radical by treatment of the epichlorohydrin reaction product with at least an equimolecular quantity of an alkali metal hydroxide, such as sodium hydroxide. Upon separation of the two liquid phases and distillation in vacuo of the organic phase, the corresponding 4,7-methano-3a,4,5,6,7,7a-hexahydroindenyl glycidyl ether product is recovered as a colorless mobile liquid.

The corresponding glycidyl ether product, prepared as above, is epoxidized with at least an equimolecular quantity of epoxidizing agent, which is added slowly with stirring. Suitable epoxidizing agents are hypochlorous acid and the peracids, such as peracetic acid, performic acid, perbenzoic acid, and the like. The temperature of the reaction is kept low, below about 35° C., to prevent undesirable side reactions. After the reaction is complete, as determined by the peracid content in the reaction mixture, the reaction product is worked up by separating from water, extracting with diethyl ether, drying, and stripping of the diethyl ether. The crude diepoxide compound can be used as such in the method of the present invention, or can be purified by distilling in vacuo to recover the isolated compound.

The manner in which the aforesaid compounds can be prepared is illustrated in the following examples. While specific reactants are presented in any given example, it is understood that there can be substituted for the polycyclopentadiene reactant any other reactant falling within the previously described scope of said reactant.

EXAMPLE 1

*Preparation of 4,7-Methano-3a,4,5,6,7,7a-Hexahydroindenyl 2-Hydroxy-3-Chloropropyl Ether*

Hydroxy - 4,7 - methano - 3a,4,5,6,7,7a - hexahydroindene (75 g.; 0.5 mole), prepared as described in Example 1 of United States Patent No. 2,374,173 to Bruson (therein referred to as hydroxy-dihydronordicyclopentadiene), epichlorohydrin (23 g.; 0.25 mole) and toluene (50 ml.) were placed into a 300 ml. three-necked, round-bottom flask fitted with a mechanical stirrer, thermometer, and reflux condenser. Boron trifluoride-etherate complex (approximately 12 drops) was added with stirring, and the stirred contents were heated to 70° C., at which temperature the reaction became exothermic. The temperature was controlled below about 80 °C., by means of an ice water bath until the exothermic reaction subsided. The contents of the flask were then heated to 95° C. for 15 minutes. Sodium bicarbonate (10 g.) was added, and the contents were again heated to 95° C. for 15 minutes. The contents of the flask were filtered and the toluene stripped from the filtrate by use of an aspirator followed by stripping of the unreacted reactants by distillation in vacuo. The product 4,7-methano-3a,4,5,6,7,7a-hexahydroindenyl 2-hydroxy-3-chloropropyl ether was recovered by distillation in vacuo as a colorless liquid boiling at 128–129° C. at 1 mm. of mercury pressure.

EXAMPLE 2

*Preparation of 4,7-Methano-3a,4,5,6,7,7a-Hexahydroindenyl Glycidyl Ether*

The product of the previous example (38.5 g.; 0.16 mole) and toluene (60 ml.) were charged to the flask described above, fitted with a mechanical stirrer and thermometer. Sodium hydroxide (12.7 g.) in 50% aqueous solution was added with stirring. The contents of the flask were heated at 80–100° C. for 3 hours. The organic layer was separated from the aqueous layer, and washed with an equal amount by volume of water. The organic layer was dried over anhydrous sodium sulfate and ether and toluene were distilled therefrom in vacuo. 4,7-methano-3a,4,5,6,7,7a-hexahydroindenyl glycidyl ether was recovered from the residue by distillation in vacuo as a colorless mobile liquid boiling at 108°–112° C. at 1.1 mm. of mercury pressure and having a refractive index of 1.505 at 25.5° C.

EXAMPLE 3

*Preparation of 2,3-Epoxy-4,7-Methanohexahydroindanyl Glycidyl Ether*

A 250 ml. three-necked, round-bottom flask fitted with a mechanical stirrer, reflux condenser, internal thermometer, and dropping funnel, was charged with 4,7-methano - 3a,4,5,6,7,7a - hexahydroindenyl glycidyl ether (50 g.; 0.2 mole) and diethyl ether (approximately 5 ml.). The dropping funnel was charged with 40% peracetic acid solution (50.4 g.; equivalent to 0.26 mol peracid) to which had previously been added sodium acetate (1.7 g.) to neutralize the sulfuric acid present in the stock solution. The peracetic acid solution was added dropwise with stirring, so as to control the temperature at 25–30° C. After 2 hours the peroxide content of the reaction mixture remained constant. The reaction mixture was poured into water (about 500 cc.), and the organic phase separated therefrom, dissolved in diethyl ether, washed with aqueous sodium carbonate and water until the wash water was no longer acidic, and dried over anhydrous sodium sulfate. The dried ethereal solution was filtered free of drying agent and stripped of solvent in vacuo. The residue was distilled in vacuo and 2,3-epoxy-4,7-methanohexahydroindanyl glycidyl ether was recovered as the fraction 125°–135° C. at 0.85 mm. of mercury pressure. The product analyzed as follows for $C_{13}H_{18}O_3$:

|  | C | H | Oxirane Oxygen |
| --- | --- | --- | --- |
| Theoretical, percent | 70.24 | 8.16 | 14.40 |
| Found, percent | 69.88 | 8.14 | 13.80 |

EXAMPLE 4

*Preparation of Dimethylhydroxy-4,7-Methano-3a,4,5,6,7,7a-Hexahydroindene*

Dimethyldicyclopentadiene (160 g.; 1 mole) and aqueous 25% sulfuric acid (400 g.) are stirred rapidly and heated at reflux for 5 hours. The aqueous layer is drawn off and the organic layer washed with hot water, aqueous sodium hydroxide solution, and again with hot water. The organic layer is then distilled in vacuo to recover dimethyl - hydroxy-4,7-methano-3a,4,5,6,7,7a-hexahydroindene.

EXAMPLE 5

*Preparation of Dimethyl-4,7-Methano-3a,4,5,6,7,7a-Hexahydroindenyl Glycidyl Ether*

Dimethylhydroxy-4,7-methano - 3a,4,5,6,7,7a - hexahydroindene (89 g.; 0.5 mole) prepared as in Example 3 and epichlorohydrin (23 g.; 0.25 mole) are reacted by the procedure described in Example 1. The propylene chlorohydrin intermediate thus produced is converted to dimethyl-4,7-methano - 3a,4,5,6,7,7a - hexahydroindenyl glycidyl ether by the dehydrohalogenation procedure of Example 2. Dimethyl-4,7-methano-3a,4,5,6,7,7a-hexahydroindenyl glycidyl ether is recovered by distillation in vacuo from the crude residue after removal of the solvents.

EXAMPLE 6

*Preparation of Dimethyl-2,3-Epoxy-4,7-Methano-Hexahydroindanyl Glycidyl Ether*

Dimethyl - 4,7 - methano - 3a,4,5,6,7,7a - hexahydroindenyl glycidyl ether (43.5 g.; 0.2 mole) is treated with peracetic acid (50.4 g.) by the method of Example 3 to yield dimethyl - 2,3-epoxy-4,7-methanohexahydroindanyl glycidyl ether, which can be used as such, or can be purified by distillation in vacuo.

EXAMPLE 7

*Preparation of a Mixture of 2,3-Epoxy-4,7-Methano-Hexahydroindanyl Glycidyl Ethers*

A dicyclopentadiene fraction (150 g.) of 95% purity, the impurities consisting essentially of about 3% monomethyldicyclopentadiene and 2% dimethyldicyclopentadiene, is treated with aqueous sulfuric acid by the method of Example 4 to yield the hydroxy derivatives, which are reacted with epichlorohydrin (25 g.) by the method of Example 1, and the product thereof dehydrohalogenated by the method of Example 2, to yield the corresponding mixture of 4,7-methano-3a,4,5,6,7,7a-hexahydroindenyl glycidyl ethers. The latter mixture is epoxidized with peracetic acid by the method of Example 3, to yield a mixture of 2,3-epoxy-4,7-methanohexahydroindanyl glycidyl ethers.

For practical use as herbicides, the compounds used in the method of this invention are formulated with inert carriers to obtain proper concentrations and to facilitate handling. For example, these compounds can be formulated into dusts by combining them with such inert substances as talcs or clays. The said compounds are particularly suited to such dust formulations, and dusts containing from 5 to 25 percent by weight of active compound are convenient for use in the field. The compounds of this invention, however, are preferably applied as sprays. These can be made as simple solutions by dissolving the compounds in organic solvents such as xylene, kerosene, or the methylated naphthalenes. Solvent solutions of these compounds, which ordinarily are liquids at room temperature, are particularly suited to formulation by this method.

The compounds used in the method of this invention can also be emulsified or suspended in water by the addition of emulsifiers and wetting agents. The formulations of these active herbicidal compounds are either applied directly to the plants to be controlled, or the soil in which the plants are growing can be treated. Substances such as other pesticides, stabilizers, activators, synergists, spreaders and adhesives can be added to the formulations if desired. There is no significant difference in effect from the amount of water or organic solvent for diluting these compounds providing the same amount of chemical is distributed evenly over a given area. Such distribution can be obtained, for example, with low-pressure, low-volume sprays at the rate of about 10 gallons of spray per acre.

In applying the compounds, consideration must be given to the nature and stage of growth of the crop, the species of weeds present, the stage of growth of the weeds, environmental factors influencing the rate and vigor of the weed growth, weather conditions at the time of application and immediately following, and the dosage to be applied to a given area. Weeds are most susceptible when they are small and growing rapidly. Early application, therefore, results in better control with less chemical and increased yields because of the early destruction of the competing weeds. The larger and older the weeds the higher the concentration needed to kill them. Summer annuals should be sprayed when they are less than 4 inches high. Winter annuals are most easily killed while they are still in the rosette stage. Usually weeds growing rapidly under optimum conditions are relatively susceptible, whereas those growing under adverse conditions tends to be resistant to the herbicide sprays.

Exemplary of the more important weeds requiring effective control are lamb's-quarters, pigweeds, cocklebur, sunflower, mustards, fan feed, yellow star-thistle, wild radish, French weed, crabgrass, yellow foxtail, ryegrass, chickweed, and white cockle.

The effectiveness of these compounds in small quantities makes them economically sound for weed control on large areas, with a great saving in labor and cost, in addition to corresponding crop increases. These compounds are particularly valuable in weed control because they are harmful to many weeds but harmless or relatively harmless to some cultivated crops. Minute quantities in contact with plant tissues may be absorbed and translocated to all parts of the plant, causing striking changes in the form and functions and often resulting in their death. The actual amount of compound to be used depends on a variety of factors but is influenced primarily by the species of undesirable plant to be controlled. Thus, while fractions of a pound of actual compound are often sufficient for post-emergence weed control on an acre of corn, seed flax, perennial grass seed crops, pastures or grazing areas (without legumes), wheat, and the like, the particular species of weeds encountered in evergreen and deciduous dormant nursery stock, nursery conifers, waste areas, woody brush, and the like may require the use of one or more pounds of compound per acre for good control. Dosage adjustments with the low-volume, low-pressure applications suggested can be made by changing the nozzle size, nozzle spacing, pressure, or traveling rate of the spray equipment.

The manner in which the aforesaid compounds can be utilized in the method of the present invention is illustrated in the following examples.

EXAMPLE 8

*Preparation of an Emulsifiable Concentrate of 2,3-Epoxy-4,7-Methano-Hexahydroindanyl Glycidyl Ether*

The following concentrate is prepared by mixing the ingredients intimately in the given percentage proportions by weight:

| | Percent |
|---|---|
| Product of Example 3 | 25 |
| Antarox A–400 | 40 |
| Methanol | 35 |

"Anatarox A–400" is the trade name under which a nonionic detergent of the aromatic polyethylene glycol ether type is sold. The above concentrate is diluted with water to the desired concentration for use.

EXAMPLE 9

*Preparation of an Emulsifiable Concentrate of Dimethyl-2,3-Epoxy - 4,7 - Methano-Hexahydroindanyl Glycidyl Ether*

The following ingredients are mixed thoroughly in the given percentage proportions by weight:

| | Percent |
|---|---|
| Product of Example 6 | 59 |
| Xylene | 10 |
| Triton X–100 | 5 |
| Kerosene | 26 |

"Triton X–100" is the trade name under which an emulsifier of the alkyl aryl polyether alcohol type is sold. The above concentrate is diluted with water to the desired concentration for use.

EXAMPLE 10

*Preparation of a Dust From 2,3-Epoxy-4,7-Methano-Hexahydroindanyl Glycidyl Ether*

The product of Example 3 (10% by weight) and talc (90% by weight) are combined and ground to the desired particle size in a mechanical grinder-blender.

The herbicidal activity of chemical compounds is often demonstrated by the ability of the chemicals to kill or arrest the growth of tomato plants or weeds, such as those previously named. These plants are readily grown and maintained under uniform conditions for experimental purposes in greenhouses, and its response to chemicals is very similar to that observed for a wide variety of economically important species of undesirable plant life in the field.

The herbicidal effectiveness of the method of this invention, for example, can be demonstrated in greenhouse experiments on young potted crabgrass and foxtail weeds.

The compounds to be tested are formulated into acetone-water solutions. Duplicate paper pots filled with a sand and vermiculite are seeded with crabgrass and foxtail seeds. The seeds are germinated and the weeds grown under artificial lighting with irrigation provided by placing the porous pots in a small amount of water in stainless steel trays. After the weeds have reached a suitable size (about 10 days), they are sprayed with the spray formulations described above at a rate of four pounds actual chemical per acre. Control plants are sprayed with acetone-water solution. The weeds are then observed for a week to ten days and injury recorded.

In actual experiments carried out as described above, crabgrass and foxtail weeds treated with formulations of the product of Example 3 showed a marked degree of herbicidal injury, while control weeds treated with acetone-water solution showed no injury.

I claim:

1. A method of destroying undesirable plant life which comprises applying thereto a herbicidal composition comprising an inert carrier and, in a quantity which is herbicidally toxic to said undesirable plant life, a compound selected from the group consisting of a compound of the formula

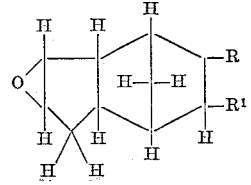

wherein R and $R^1$ are non-identical substituents selected from the group consisting of hydrogen and 2,3-epoxypropoxy, provided that one of said substituents is hydrogen; its monomethyl homologs, wherein the methyl radical is on a 5-membered ring; its dimethyl homologs, wherein the methyl radicals are on non-adjacent 5-membered rings; and mixtures thereof.

2. A method of destroying growing weeds which comprises contacting said weeds with a herbicidal composition comprising an inert carrier and, in a quantity which is herbicidally toxic to said weeds, a compound selected from the group consisting of a compound of the formula

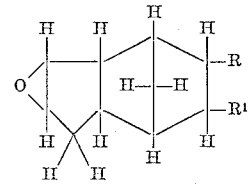

wherein R and $R^1$ are non-identical substituents selected from the group consisting of hydrogen and 2,3-epoxypropoxy, provided that one of said substituents is hydrogen; its monomethyl homologs, wherein the methyl radical is on a 5-membered ring; its dimethyl homologs, wherein the methyl radicals are on non-adjacent 5-membered rings; and mixtures thereof.

3. A method of destroying growing weeds which comprises contacting said weeds with a herbicidal composition comprising an inert carrier and, in a quantity which is herbicidally toxic to said weeds, 2,3-epoxy-4,7-methano-hexahydro-5-indanyl glycidyl ether.

4. A method of destroying growing weeds which comprises contacting said weeds with a herbicidal composition comprising an inert carrier, and in a quantity which is herbicidally toxic to said weeds, 2,3-epoxy-4,7-methano-hexahydro-6-indanyl glycidyl ether.

5. A method of destroying growing weeds which comprises contacting said weeds with a herbicidal composition comprising an inert carrier, and in a quantity which is herbicidally toxic to said weeds, a mixture of the isomers: 2,3-epoxy-4,7-methano-hexahydro-5-indanyl glycidyl ether and 2,3-epoxy-4,7-methano-hexahydro-6-indanyl glycidyl ether.

References Cited in the file of this patent

UNITED STATES PATENTS 3,012,079    Bruson et al. _____ Dec. 5, 1961

UNITED STATES PATENT OFFICE
CERTIFICATE OF CORRECTION

Patent No. 3,117,852                                January 14, 1964

Israel J. Dissen

It is hereby certified that error appears in the above numbered patent requiring correction and that the said Letters Patent should read as corrected below.

Column 1, lines 15 to 20, the formula should appear as shown below instead of as in the patent:

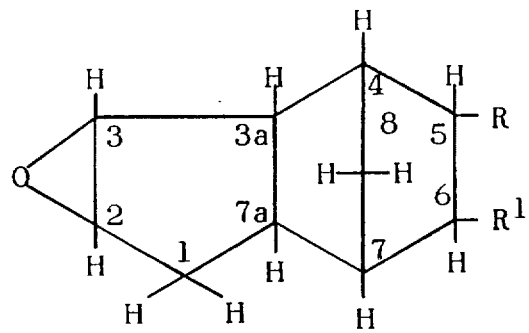

Column 7, lines 44 to 52, the formula should appear as shown below instead of as in the patent:

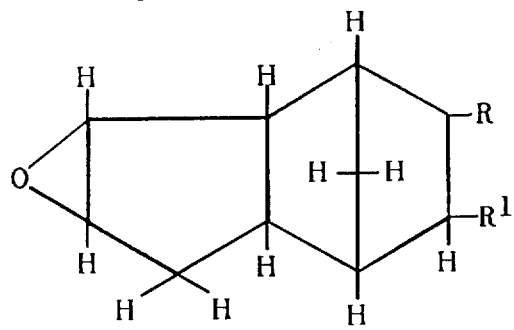

Signed and sealed this 23rd day of June 1964.

SEAL)
ttest:

RNEST W. SWIDER
ttesting Officer

EDWARD J. BRENNER
Commissioner of Patents